United States Patent
Feechan et al.

(10) Patent No.: US 8,671,992 B2
(45) Date of Patent: Mar. 18, 2014

(54) MULTI-CELL SPOOLABLE COMPOSITE PIPE

(75) Inventors: Michael Feechan, Katy, TX (US); Peter A. Quigley, Duxbury, MA (US)

(73) Assignee: Fiberspar Corporation, New Bedford, MA (US)

(*) Notice: Subject to any disclaimer, the term of this patent is extended or adjusted under 35 U.S.C. 154(b) by 1362 days.

(21) Appl. No.: 12/024,361

(22) Filed: Feb. 1, 2008

(65) Prior Publication Data

US 2008/0185042 A1  Aug. 7, 2008

Related U.S. Application Data

(60) Provisional application No. 60/887,875, filed on Feb. 2, 2007.

(51) Int. Cl.
   *F16L 9/18*        (2006.01)
(52) U.S. Cl.
   USPC ............................ 138/115; 138/117; 138/125
(58) Field of Classification Search
   USPC .......................... 138/115, 116, 117, 124, 125
   See application file for complete search history.

(56) References Cited

U.S. PATENT DOCUMENTS

| | | | |
|---|---|---|---|
| 87,993 A | 3/1869 | Weston | |
| 396,176 A | 1/1889 | Simpson | |
| 418,906 A | 1/1890 | Bosworth | |
| 482,181 A | 9/1892 | Kellom | |
| 646,887 A | 4/1900 | Stowe et al. | |
| 749,633 A | 1/1904 | Seeley | |
| 1,234,812 A | 7/1917 | Simmmons | |
| 1,793,455 A | 2/1931 | Buchanan | |
| 1,890,290 A | 12/1932 | Hargreaves | |
| 1,930,285 A | 10/1933 | Robinson | |
| 2,099,407 A * | 11/1937 | Mildner | 174/13 |
| 2,464,416 A | 3/1949 | Raybould | |
| 2,467,520 A | 4/1949 | Brubaker | |
| 2,481,001 A | 9/1949 | Burckle | |
| 2,624,366 A | 1/1953 | Pugh | |
| 2,648,720 A | 8/1953 | Alexander | |
| 2,690,769 A | 10/1954 | Brown | |
| 2,725,713 A | 12/1955 | Blanchard | |
| 2,750,569 A | 6/1956 | Moon | |
| 2,810,424 A | 10/1957 | Swartswelter at al. | |
| 2,973,975 A | 3/1961 | Ramberg et al. | |
| 2,991,093 A | 7/1961 | Guarnaschelli | |

(Continued)

FOREIGN PATENT DOCUMENTS

| | | |
|---|---|---|
| BE | 559688 | 8/1957 |
| CH | 461199 | 8/1968 |

(Continued)

OTHER PUBLICATIONS

International Search Report mailed on Jan. 22, 2001.

(Continued)

*Primary Examiner* — Steven J Ganey
(74) *Attorney, Agent, or Firm* — Goodwin Procter LLP

(57) ABSTRACT

This disclosure relates to a spoolable pipe or tube that comprises two or more channels or cells, for example, a plurality of channels, for enhanced or improved fluid transport of one, two, or multi-phase fluids, such as found in the transport of oil and/or natural gas. Also provided are methods for making the disclosed tubes, and methods of transporting multi-phase fluids.

16 Claims, 2 Drawing Sheets

(56) References Cited

U.S. PATENT DOCUMENTS

| | | | |
|---|---|---|---|
| 3,086,369 A | 4/1963 | Brown | |
| 3,116,760 A | 1/1964 | Matthews | |
| 3,170,137 A | 2/1965 | Brandt | |
| 3,277,231 A | 10/1966 | Downey at al. | |
| 3,306,637 A | 2/1967 | Press at al. | |
| 3,334,663 A | 8/1967 | Peterson | |
| 3,379,220 A | 4/1968 | Kiuchi at al. | |
| 3,390,704 A | 7/1968 | Woodell | |
| 3,413,169 A * | 11/1968 | Krings et al. | 156/149 |
| 3,477,474 A | 11/1969 | Mesler | |
| 3,507,412 A | 4/1970 | Carter | |
| 3,522,413 A | 8/1970 | Chrow | |
| 3,526,086 A * | 9/1970 | Morgan | 138/111 |
| 3,554,284 A | 1/1971 | Nystrom | |
| 3,579,402 A | 5/1971 | Goldsworthy et al. | |
| 3,589,135 A | 6/1971 | Ede | |
| 3,589,752 A | 6/1971 | Spencer et al. | |
| 3,604,461 A | 9/1971 | Matthews | |
| 3,606,396 A | 9/1971 | Prosdocimo at al. | |
| 3,606,402 A | 9/1971 | Medney | |
| 3,677,978 A | 7/1972 | Dowbenko et al. | |
| 3,685,860 A | 8/1972 | Schmidt | |
| 3,692,601 A | 9/1972 | Goldsworthy et al. | |
| 3,696,332 A | 10/1972 | Dickson, Jr. et al. | |
| 3,700,519 A | 10/1972 | Carter | |
| 3,701,489 A | 10/1972 | Goldsworthy et al. | |
| 3,728,187 A | 4/1973 | Martin | |
| 3,730,229 A | 5/1973 | D'Onofrio | |
| 3,734,421 A | 5/1973 | Karlson et al. | |
| 3,738,637 A | 6/1973 | Goldsworthy et al. | |
| 3,740,285 A | 6/1973 | Goldsworthy et al. | |
| 3,744,016 A | 7/1973 | Davis | |
| 3,769,127 A | 10/1973 | Goldsworthy et al. | |
| 3,773,090 A | 11/1973 | Ghersa et al. | |
| 3,776,805 A | 12/1973 | Hansen | |
| 3,783,060 A | 1/1974 | Goldsworthy at al. | |
| 3,814,138 A | 6/1974 | Courtot | |
| 3,817,288 A | 6/1974 | Ball | |
| 3,828,112 A | 8/1974 | Johansen et al. | |
| 3,856,052 A | 12/1974 | Feucht | |
| 3,860,040 A | 1/1975 | Sullivan | |
| 3,860,742 A | 1/1975 | Medney | |
| 3,901,281 A | 8/1975 | Morrisey | |
| 3,907,335 A | 9/1975 | Burge et al. | |
| 3,913,624 A | 10/1975 | Ball | |
| 3,933,180 A | 1/1976 | Carter | |
| 3,956,051 A | 5/1976 | Carter | |
| 3,957,410 A | 5/1976 | Goldsworthy et al. | |
| 3,960,629 A | 6/1976 | Goldsworthy | |
| 3,974,862 A | 8/1976 | Fuhrmann et al. | |
| 3,980,325 A | 9/1976 | Robertson | |
| RE29,112 E | 1/1977 | Carter | |
| 4,032,177 A | 6/1977 | Anderson | |
| 4,048,807 A | 9/1977 | Ellers et al. | |
| 4,053,343 A | 10/1977 | Carter | |
| 4,057,610 A | 11/1977 | Goettler et al. | |
| 4,095,865 A | 6/1978 | Denison et al. | |
| 4,108,701 A | 8/1978 | Stanley | |
| 4,111,469 A | 9/1978 | Kavick | |
| 4,114,393 A | 9/1978 | Engle, Jr. et al. | |
| 4,125,423 A | 11/1978 | Goldsworthy | |
| 4,133,972 A | 1/1979 | Andersson et al. | |
| 4,137,949 A | 2/1979 | Linko, III et al. | |
| 4,139,025 A | 2/1979 | Carlstrom et al. | |
| 4,190,088 A | 2/1980 | Lalikos et al. | |
| 4,196,307 A * | 4/1980 | Moore et al. | 174/47 |
| 4,200,126 A | 4/1980 | Fish | |
| 4,220,381 A | 9/1980 | van der Graaf et al. | |
| 4,226,446 A | 10/1980 | Burrington | |
| 4,241,763 A | 12/1980 | Antal et al. | |
| 4,248,062 A | 2/1981 | McLain et al. | |
| 4,261,390 A | 4/1981 | Belofsky | |
| 4,273,160 A | 6/1981 | Lowles | |
| 4,303,263 A | 12/1981 | Legris | |
| 4,303,457 A | 12/1981 | Johansen et al. | |
| 4,306,591 A | 12/1981 | Arterburn | |
| 4,308,999 A | 1/1982 | Carter | |
| 4,336,415 A | 6/1982 | Walling | |
| 4,351,364 A | 9/1982 | Cocks et al. | |
| 4,380,252 A | 4/1983 | Gray et al. | |
| 4,402,346 A | 9/1983 | Cheetham et al. | |
| 4,422,801 A | 12/1983 | Hale et al. | |
| 4,445,734 A | 5/1984 | Cunningham | |
| 4,446,892 A | 5/1984 | Maxwell et al. | |
| 4,447,378 A | 5/1984 | Gray et al. | |
| 4,463,779 A | 8/1984 | Wink et al. | |
| 4,488,577 A | 12/1984 | Shilad et al. | |
| 4,507,019 A | 3/1985 | Thompson | |
| 4,515,737 A | 5/1985 | Karino et al. | |
| 4,522,058 A | 6/1985 | Ewing | |
| 4,522,235 A | 6/1985 | Kluss et al. | |
| 4,530,379 A | 7/1985 | Policelli | |
| 4,556,340 A | 12/1985 | Morton | |
| 4,567,916 A | 2/1986 | Antal et al. | |
| 4,578,675 A | 3/1986 | MacLeod | |
| 4,606,378 A | 8/1986 | Meyer et al. | |
| 4,627,472 A | 12/1986 | Goettler et al. | |
| 4,657,795 A | 4/1987 | Foret et al. | |
| 4,681,169 A | 7/1987 | Brookbank, III | |
| 4,700,751 A | 10/1987 | Fedrick | |
| 4,712,813 A | 12/1987 | Passerell et al. | |
| 4,728,224 A | 3/1988 | Salama et al. | |
| 4,741,795 A | 5/1988 | Grace et al. | |
| 4,758,455 A | 7/1988 | Campbell et al. | |
| 4,789,007 A | 12/1988 | Cretel et al. | |
| 4,842,024 A | 6/1989 | Palinchak | |
| 4,844,516 A | 7/1989 | Baker | |
| 4,849,668 A | 7/1989 | Crawley et al. | |
| 4,859,024 A | 8/1989 | Rahman | |
| 4,903,735 A | 2/1990 | Delacour et al. | |
| 4,913,657 A | 4/1990 | Naito et al. | |
| 4,936,618 A | 6/1990 | Sampa et al. | |
| 4,941,774 A | 7/1990 | Harmstorf et al. | |
| 4,942,903 A | 7/1990 | Jacobsen et al. | |
| 4,972,880 A | 11/1990 | Strand | |
| 4,992,787 A | 2/1991 | Helm | |
| 4,995,761 A | 2/1991 | Barton | |
| 5,048,572 A | 9/1991 | Levine | |
| 5,077,107 A | 12/1991 | Kaneda et al. | |
| 5,090,741 A | 2/1992 | Yokomatsu et al. | |
| 5,097,870 A | 3/1992 | Williams | |
| 5,156,206 A | 10/1992 | Cox | |
| 5,170,011 A | 12/1992 | Martucci | |
| 5,172,765 A | 12/1992 | Sas-Jaworsky et al. | |
| 5,176,180 A | 1/1993 | Williams et al. | |
| 5,182,779 A | 1/1993 | D'Agostino et al. | |
| 5,184,682 A | 2/1993 | Delacour et al. | |
| 5,188,872 A | 2/1993 | Quigley | |
| 5,209,136 A | 5/1993 | Williams | |
| 5,222,769 A | 6/1993 | Kaempen | |
| 5,261,462 A | 11/1993 | Wolfe et al. | |
| 5,265,648 A | 11/1993 | Lyon | |
| 5,285,008 A | 2/1994 | Sas-Jaworsky et al. | |
| 5,285,204 A | 2/1994 | Sas-Jaworsky | |
| 5,330,807 A | 7/1994 | Williams | |
| 5,332,269 A | 7/1994 | Homm | |
| 5,334,801 A | 8/1994 | Mohn et al. | |
| 5,346,658 A | 9/1994 | Gargiulo | |
| 5,348,088 A | 9/1994 | Laflin et al. | |
| 5,348,096 A | 9/1994 | Williams | |
| 5,351,752 A | 10/1994 | Wood et al. | |
| RE34,780 E | 11/1994 | Trenconsky et al. | |
| 5,364,130 A | 11/1994 | Thalmann | |
| 5,394,488 A | 2/1995 | Fernald et al. | |
| 5,395,913 A | 3/1995 | Bottcher et al. | |
| 5,398,729 A | 3/1995 | Spurgat | |
| 5,416,724 A | 5/1995 | Savic | |
| 5,426,297 A | 6/1995 | Dunphy et al. | |
| 5,428,706 A | 6/1995 | Lequeux et al. | |
| 5,435,867 A | 7/1995 | Wolfe et al. | |
| 5,437,311 A | 8/1995 | Reynolds | |
| 5,443,099 A | 8/1995 | Chaussepied et al. | |
| 5,452,923 A | 9/1995 | Smith | |
| RE35,081 E | 11/1995 | Quigley | |

(56) References Cited

U.S. PATENT DOCUMENTS

| | | | |
|---|---|---|---|
| 5,469,916 A | 11/1995 | Sas-Jaworsky et al. | |
| 5,472,764 A | 12/1995 | Kehr et al. | |
| 5,499,661 A | 3/1996 | Odru et al. | |
| 5,524,937 A | 6/1996 | Sides, III et al. | |
| 5,525,698 A | 6/1996 | Bottcher et al. | |
| 5,538,513 A | 7/1996 | Okajima et al. | |
| 5,551,484 A | 9/1996 | Charboneau | |
| 5,558,375 A | 9/1996 | Newman | |
| 5,622,211 A | 4/1997 | Martin et al. | |
| 5,641,956 A | 6/1997 | Vengsarkar et al. | |
| 5,671,811 A | 9/1997 | Head | |
| 5,683,204 A | 11/1997 | Lawther et al. | |
| 5,692,545 A * | 12/1997 | Rodrigue | 138/115 |
| 5,730,188 A | 3/1998 | Kalman et al. | |
| 5,755,266 A | 5/1998 | Aanonsen et al. | |
| 5,758,990 A | 6/1998 | Davies et al. | |
| 5,795,102 A | 8/1998 | Corbishley et al. | |
| 5,797,702 A | 8/1998 | Drost et al. | |
| 5,798,155 A | 8/1998 | Yanagawa et al. | |
| 5,804,268 A | 9/1998 | Mukawa et al. | |
| 5,828,003 A | 10/1998 | Thomeer et al. | |
| 5,875,792 A | 3/1999 | Campbell, Jr. et al. | |
| 5,902,958 A * | 5/1999 | Haxton | 174/47 |
| 5,908,049 A | 6/1999 | Williams et al. | |
| 5,913,337 A * | 6/1999 | Williams et al. | 138/125 |
| 5,921,285 A | 7/1999 | Quigley et al. | |
| 5,933,945 A | 8/1999 | Thomeer et al. | |
| 5,950,651 A | 9/1999 | Kenworthy et al. | |
| 5,951,812 A | 9/1999 | Gilchrist, Jr. | |
| 5,979,506 A * | 11/1999 | Aarseth | 138/33 |
| 5,984,581 A | 11/1999 | McGill et al. | |
| 5,988,702 A | 11/1999 | Sas-Jaworsky | |
| 6,004,639 A * | 12/1999 | Quigley et al. | 428/36.3 |
| 6,016,845 A | 1/2000 | Quigley et al. | |
| 6,032,699 A | 3/2000 | Cochran et al. | |
| 6,066,377 A | 5/2000 | Tonyali et al. | |
| 6,093,752 A | 7/2000 | Park et al. | |
| 6,136,216 A | 10/2000 | Fidler et al. | |
| 6,148,866 A | 11/2000 | Quigley et al. | |
| RE37,109 E * | 3/2001 | Ganelin | 166/372 |
| 6,209,587 B1 | 4/2001 | Hsich et al. | |
| 6,220,079 B1 | 4/2001 | Taylor et al. | |
| 6,286,558 B1 | 9/2001 | Quigley et al. | |
| 6,315,002 B1 | 11/2001 | Antal et al. | |
| 6,328,075 B1 | 12/2001 | Furuta et al. | |
| 6,334,466 B1 | 1/2002 | Jani et al. | |
| 6,357,485 B2 | 3/2002 | Quigley et al. | |
| 6,357,966 B1 | 3/2002 | Thompson et al. | |
| 6,361,299 B1 | 3/2002 | Quigley et al. | |
| 6,372,861 B1 | 4/2002 | Schillgalies et al. | |
| 6,390,140 B2 | 5/2002 | Niki et al. | |
| 6,402,430 B1 | 6/2002 | Guesnon et al. | |
| 6,422,269 B1 | 7/2002 | Johansson et al. | |
| 6,461,079 B1 | 10/2002 | Beaujean et al. | |
| 6,470,915 B1 | 10/2002 | Enders et al. | |
| 6,532,994 B1 | 3/2003 | Enders et al. | |
| 6,538,198 B1 * | 3/2003 | Wooters | 174/47 |
| 6,604,550 B2 | 8/2003 | Quigley et al. | |
| 6,631,743 B2 | 10/2003 | Enders et al. | |
| 6,634,387 B1 | 10/2003 | Glejbøl et al. | |
| 6,634,388 B1 | 10/2003 | Taylor et al. | |
| 6,663,453 B2 | 12/2003 | Quigley et al. | |
| 6,706,348 B2 | 3/2004 | Quigley et al. | |
| 6,764,365 B2 | 7/2004 | Quigley et al. | |
| 6,807,989 B2 | 10/2004 | Enders et al. | |
| 6,857,452 B2 | 2/2005 | Quigley et al. | |
| 6,902,205 B2 | 6/2005 | Bouey et al. | |
| 6,978,804 B2 | 12/2005 | Quigley et al. | |
| 6,983,766 B2 | 1/2006 | Baron et al. | |
| 7,029,356 B2 | 4/2006 | Quigley et al. | |
| 7,080,667 B2 | 7/2006 | McIntyre et al. | |
| 7,152,632 B2 | 12/2006 | Quigley et al. | |
| 7,234,410 B2 | 6/2007 | Quigley et al. | |
| 7,243,716 B2 | 7/2007 | Denniel et al. | |
| 7,285,333 B2 | 10/2007 | Wideman et al. | |
| 7,498,509 B2 | 3/2009 | Brotzell et al. | |
| 2001/0006712 A1 | 7/2001 | Hibino et al. | |
| 2002/0119271 A1 | 8/2002 | Quigley et al. | |
| 2002/0185188 A1 | 12/2002 | Quigley et al. | |
| 2004/0096614 A1 | 5/2004 | Quigley et al. | |
| 2005/0189029 A1 | 9/2005 | Quigley et al. | |
| 2007/0125439 A1 | 6/2007 | Quigley et al. | |
| 2007/0154269 A1 | 7/2007 | Quigley et al. | |
| 2008/0006337 A1 | 1/2008 | Quigley et al. | |
| 2008/0006338 A1 | 1/2008 | Wideman et al. | |
| 2008/0014812 A1 | 1/2008 | Quigley et al. | |
| 2008/0185042 A1 | 8/2008 | Feechan et al. | |
| 2008/0210329 A1 | 9/2008 | Quigley et al. | |
| 2009/0107558 A1 | 4/2009 | Quigley et al. | |
| 2009/0278348 A1 | 11/2009 | Brotzell et al. | |

FOREIGN PATENT DOCUMENTS

| | | |
|---|---|---|
| DE | 1959738 | 6/1971 |
| DE | 3603597 | 8/1987 |
| DE | 4040400 A1 | 8/1992 |
| DE | 4214383 C1 | 9/1993 |
| EP | 0024512 | 3/1981 |
| EP | 0203887 A2 | 12/1986 |
| EP | 352148 | 1/1990 |
| EP | 0427306 A2 | 5/1991 |
| EP | 0503737 A1 | 9/1992 |
| EP | 505815 A2 | 9/1992 |
| EP | 0536844 A1 | 4/1993 |
| EP | 0681085 A2 | 11/1995 |
| EP | 0854029 A2 | 7/1998 |
| EP | 0953724 A2 | 11/1999 |
| EP | 0970980 | 1/2000 |
| EP | 0981992 A1 | 3/2000 |
| FR | 989204 | 9/1951 |
| GB | 553110 | 5/1943 |
| GB | 809097 | 2/1959 |
| GB | 909187 | 10/1962 |
| GB | 956500 | 4/1964 |
| GB | 1297250 | 11/1972 |
| GB | 2103744 A | 2/1983 |
| GB | 2193006 A | 1/1988 |
| GB | 2255994 A | 11/1992 |
| GB | 2270099 A | 3/1994 |
| GB | 2365096 | 2/2002 |
| JP | 163 592 | 6/1990 |
| WO | WO-87/04768 | 8/1987 |
| WO | WO-91/13925 | 9/1991 |
| WO | WO-92/21908 | 12/1992 |
| WO | WO-9307073 A1 | 4/1993 |
| WO | WO-9319927 | 10/1993 |
| WO | WO-95/02782 A1 | 1/1995 |
| WO | WO-97/12115 A2 | 4/1997 |
| WO | WO-99/19653 A1 | 4/1999 |
| WO | WO-0031458 A1 | 6/2000 |
| WO | WO2006003208 * | 1/2006 |

OTHER PUBLICATIONS

International Search Report mailed on Mar. 5, 2001.
International Search Report mailed on Nov. 8, 2005.
Austigard E. and R. Tomter ; "Composites Subsea: Cost Effective Products; an Industry Challenge", Subsea 94 International Conference, the 1994 Report on Subsea Engineering: The Continuing Challenges.
Connell Mike et al.; "Coiled Tubing: Application for Today's Challenges", Petroleum Engineer International, pp. 18-21 (Jul. 1999).
Feechan Mike et al.; "Spoolable Composites Show Promise", The American Oil & Gas Reporter, pp. 44-50 (Sep. 1999).
Fowler Hampton et al.; "Development Update and Applications of an Advanced Composite Spoolable Tubing", Offshore Technology Conference held in Houston Texas from May 4-7, 1998, pp. 157-162.
Fowler Hampton; "Advanced Composite Tubing Usable", The American Oil & Gas Reporter, pp. 76-81 (Sep. 1997).
Hahn H. Thomas and Williams G. Jerry; "Compression Failure Mechanisms in Unidirectional Composites". NASA Technical Memorandum pp. 1-42 (Aug. 1984).

(56) References Cited

OTHER PUBLICATIONS

Hansen et al.; "Qualification and Verification of Spoolable High Pressure Composite Service Lines for the Asgard Field Development Project", paper presented at the 1997 Offshore Technology Conference held in Houston Texas from May 5-8, 1997, pp. 45-54.

Hartman, D.R., et al., "High Strength Glass Fibers," Owens Coming Technical Paper (Jul. 1996).

Haug et al.; "Dynamic Umbilical with Composite Tube (DUCR)", Paper presented at the 1998 Offshore Technology Conference held in Houston Texas from 4th to 7th, 1998; pp. 699-712.

Lundberg et al.; "Spin-off Technologies from Development of Continuous Composite Tubing Manufacturing Process", Paper presented at the 1998 Offshore Technology Conference held in Houston, Texas from May 4-7, 1998 pp. 149-155.

Marker et al.; "Anaconda: Joint Development Project Leads to Digitally Controlled Composite Coiled Tubing Drilling System", Paper presented at the SPEI/COTA, Coiled Tubing Roundtable held in Houston, Texas from Apr. 5-6, 2000, pp. 1-9.

Measures et al.; "Fiber Optic Sensors for Smart Structures", Optics and Lasers Engineering 16: 127-152 (1992).

Measures R. M.; "Smart Structures with Nerves of Glass". Prog. Aerospace Sci. 26(4): 289-351 (1989).

Moe Wood T. et al.; "Spoolable, Composite Piping for Chemical and Water Injection and Hydraulic Valve Operation", Proceedings of the 11th International Conference on Offshore Mechanics and Arctic Engineering-I 992-, vol. III, Part A—Materials Engineering, pp. 199-207 (1992).

Poper Peter; "Braiding", International Encyclopedia of Composites, Published by VGH, Publishers, Inc., 220 East 23rd Street, Suite 909, New York, NY I0010, 1988.

Quigley et al.; "Development and Application of a Novel Coiled Tubing String for Concentric Workover Services", Paper presented at the 1997 Offshore Technology Conference held in Houston, Texas from May 5-8, 1997, pp. 189-202.

Rispler K. et al.; "Composite Coiled Tubing in Harsh Completion/Workover Environments", Paper presented at the SPE GAS Technology Symposium and Exhibition held in Calgary, Alberta, Canada, on Mar. 15-18, 1998, pp. 405-410.

Sas-Jaworsky II Alex.; "Developments Position Ct for Future Prominence", The American Oil & Gas Reporter, pp. 87-92 (Mar. 1996).

Sas-Jaworsky II and Bell Steve "Innovative Applications Stimulate Coiled Tubing Development", World Oil, 217(6): 61 (Jun. 1996).

Sas-Jaworsky II and Mark Elliot Teel; "Coiled Tubing 1995 Update: Production Applications", World Oil, 216 (6): 97 (Jun. 1995 ).

Sas-Jaworsky, A. and J.G. Williams, "Advanced composites enhance coiled tubing capabilities", World Oil, pp. 57-69 (Apr. 1994).

Sas-Jaworsky, A. and J.G. Williams, "Development of a composite coiled tubing for oilfield services", Society of Petroleum Engineers, SPE 26536, pp. 1-11 (1993).

Sas-Jaworsky, A. and J.G. Williams, "Enabling capabilities and potential applications of composite coiled tubing", Proceedings of World Oil's 2nd International Conference on Coiled Tubing Technology, pp. 2-9 (1994).

Shuart J. M. et al.; "Compression Behavior of ≠45o-Dominated Laminates with a Circular Hole or Impact Damage", AIAA Journal 24(1):115-122 (Jan. 1986).

Silverman A. Seth; "Spoolable Composite Pipe for Offshore Applications", Materials Selection & Design pp. 48-50 (Jan. 1997).

Williams G. J. et al.; "Composite Spoolable Pipe Development, Advancements, and Limitations", Paper presented at the 2000 Offshore Technology Conference held in Houston Texas from May 1-4, 2000, pp. 1-16.

Williams, J.G., "Oil Industry Experiences with Fiberglass Components," Offshore Technology Conference, 1987, pp. 211-220.

\* cited by examiner

MULTI-CELL SPOOLABLE COMPOSITE PIPE

RELATED APPLICATIONS

This application claims priority to U.S. Ser. No. 60/887,875 filed Feb. 2, 2007, which is hereby incorporated by reference in its entirety.

BACKGROUND

The transport of multi-phase fluids, e.g. of a gas and liquid, is often necessary in oil and gas pipelines. In such cases, the density and other properties of e.g., the gas and liquid are different and lead to differences in the velocity of the flow of each phase being transported. For example, because the gas phase velocity may be higher that the velocity of the liquid phase, the transport of one or more of the phases using pipe may be less efficient as compared to a single-phase flow e.g., a heavier liquid phase may significantly block the flow of lighter phase. An increase in pressure due to such flow resistance can cause pressure build-up and damage to the pipe. Additionally, uneven flow stemming from the transport of multiphase fluids can cause problems at the end or terminus of the pipe. The transport of oil and/or natural gas may typically involve a simultaneous flow of a gaseous phase and a liquid phase of the fluid being transported.

Steel pipe is commonly used in the oil and gas industry. However, steel pipelines, gathering lines or injection lines are usually installed using short (30-40 foot) sections. This requires additional labor and provides the possibility for fluid leakage at each fitting. Such labor intensive installation may also lead to lost revenues if production or transport of the fluids is suspended during the installation.

Further, such steel pipe is subject to corrosion. To resist internal corrosion, steel alloys, non-metallic internal coatings, or fiberglass-reinforced epoxy pipe may be used, but all may still have the disadvantage of being sectional products. In some applications, thermoplastic liners may be used as corrosion protection inside steel pipe, but these liners are susceptible to collapse by permeating gases trapped in the annulus between the liner and the steel pipe if the pressure of the bore is rapidly decreased.

There is a need for substantially non-corrosive pipe that is capable of transporting multi-phase fluids, such as may be used in the oil and gas industry.

SUMMARY

Disclosed is a spoolable pipe or tube that comprises two or more channels or cells, for example, a plurality of channels, for enhanced or improved fluid transport of one, two, or multi-phase fluids, such as found in the transport of oil and/or natural gas. For example, a spoolable tube is disclosed that includes a low axial strength internal tube or liner comprising a plurality of cells or axial channels and an outer reinforcing layer.

In some embodiments, the low axial strength liner may include a polymer such as a thermoplastic, thermoset, or elastomer. For example, the liner may include polyethylene, polyamide, and/or polypropylene. Such a liner may be formed by, e.g., extrusion.

Disclosed tubes may include one or more sensors, such as an energy conductor, or a data conductor, which may, in some embodiments, extend along the length of the tube. In some embodiments, the inner liner may further comprise axial reinforcement that is external to the inner liner.

Provided herein are also methods of forming or making a spoolable pipe, wherein such methods may comprise extruding a thermoplastic polymer to form an inner layer of a pipe that includes a plurality of channels and forming a reinforcing layer over the inner layer.

Also disclosed herein are methods of reducing the velocity of a lighter phase fluid relative to the velocity of a heavier phase in a multi-phase transport.

DETAILED DESCRIPTION

Disclosed is a spoolable pipe or tube that comprises two or more channels or cells, for example, a plurality of channels, for enhanced or improved fluid transport of one, two, or multi-phase fluids, that can be used for example, in the transport of oil and/or natural gas. For example, a spoolable tube is disclosed that includes a low axial strength internal tube or liner comprising a plurality of cells or axial channels and an outer reinforcing layer.

A low axial strength liner is understood to mean that such a liner does not contribute substantially to the axial strength of the pipe. The plurality of channels may for example extend side-by-side so that the total flow of a fluid in the tube is divided into a plurality of individual multi-phase passages. In some embodiments, the number of channels may change along the length of the pipe.

The reinforcing layer may substantially maintain the pressure of a fluid with the tube, e.g. maintain the pressure within each channel. In some embodiments, the pressure of a fluid being transported within each channel of a disclosed tube is substantially the same. In other embodiments, the pressure differential between each channel is less than 200 psi, less than 100 psi, or even less than 50 psi, e.g. between about 0.1 psi and about 100 psi.

The channels may have any cross sectional shape, e.g. circular, elliptical, or, oval, rectangular, square, polygonal, and may be of any size. The cells or channels may each have the same size, e.g. diameter and/or shape, or may each have a different size and or shape.

The internal tube or liner comprising a plurality of channels can be formed by extrusion, e.g. the inner liner may be extruded into a form with a plurality of cells or passageways. Extrusion may provide for a plurality of channels with substantially no passageways or space other than provided by the channels themselves.

The pipes described herein may provide for substantially continuous constant flow of all phases of a multi-phase fluid.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems or methods of the present disclosure.

Figure 1:
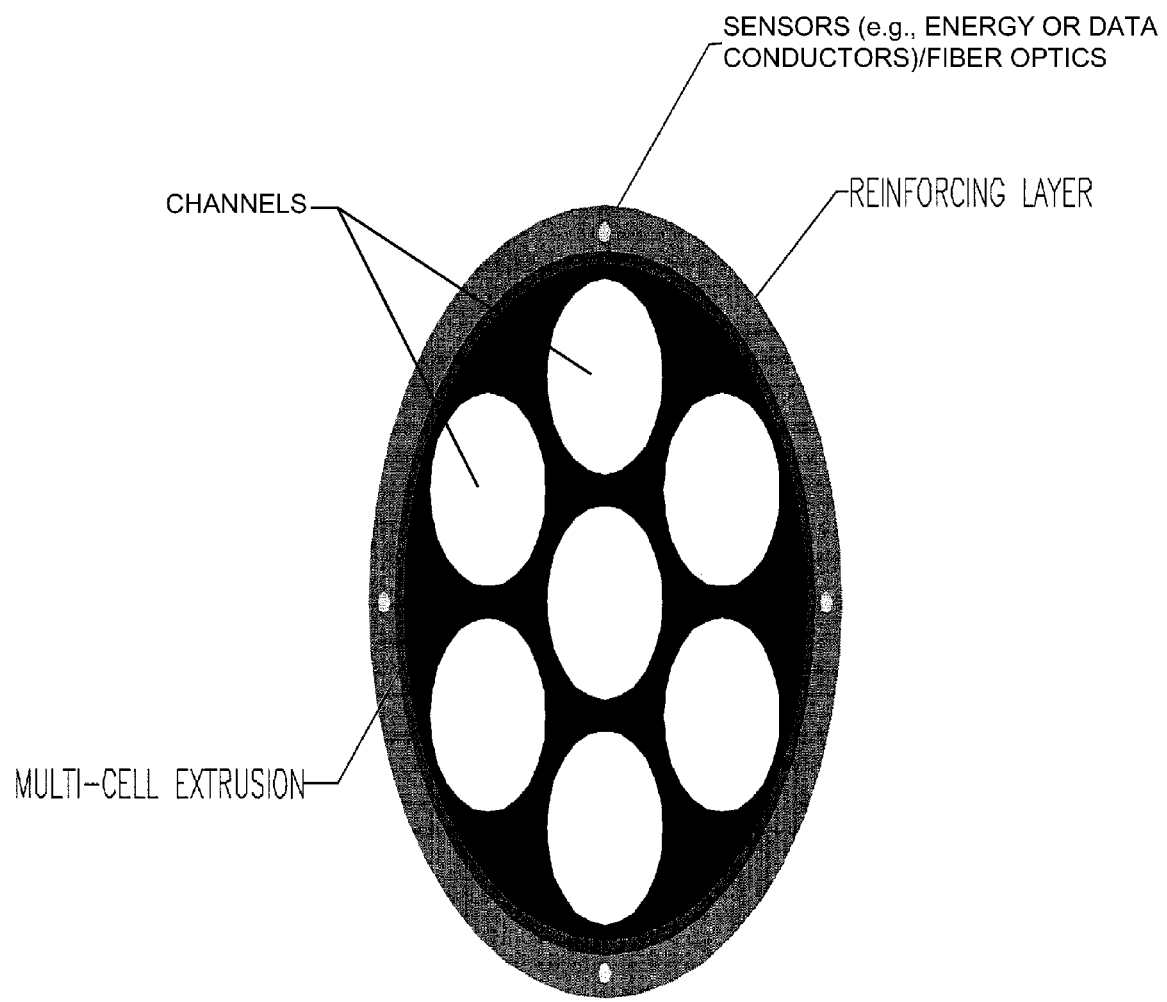
FIG. 1 depicts a disclosed pipe that includes a multi-channel extruded inner layer, a reinforcing layer, and a conductor that is integral with a wall of the pipe.

FIG. 1 depicts a exemplary tube with a inner liner comprising a plurality of axial channels, formed by multi-cell extrusion. The inner liner has low axial strength.

The inner liner can serve as a member to resist leakage of internal fluids from within the spoolable tube. In some embodiments, the liner can include a polymer, a thermoset plastic, a thermoplastic, an elastomer, a rubber, a co-polymer, and/or a composite. The composite can include a filled polymer and a nano-composite, a polymer/metallic composite, and/or a metal (e.g., steel, copper, and/or stainless steel). Accordingly, the liner can include one or more of a polyethylene, a cross-linked polyethylene, a polyvinylidene fluoride, a polyamide, polyethylene terphthalate, polyphenylene sulfide and/or a polypropylene, or combinations of these materials, either as distinct layers or as blends, alloys, copolymers, block copolymers or the like. The liner may also contain solid state additives.

In some embodiments, the liner can be formed from a polymer, e.g. a thermoplastic, by extrusion.

The spoolable tube can also include one or more reinforcing layers as depicted in FIG. 1. In one embodiment, the reinforcing layers can include fibers having at least a partially helical orientation relative to the longitudinal axis of the spoolable tube. The fibers may have a helical orientation between substantially about thirty degrees and substantially about seventy degrees relative to the longitudinal axis of the tube. For example, the fibers may be counterwound with a helical orientation of about ±40°, ±45°, ±50°, ±55°, and/or ±60°. The reinforcing layer may include fibers having multiple, different orientations about the longitudinal axis. Accordingly, the fibers may increase the load carrying strength of the reinforcing layer(s) and thus the overall load carrying strength of the spoolable tube. In another embodiment, the reinforcing layer may carry substantially no axial load carrying strength along the longitudinal axis at a termination.

The reinforcing layer(s) can be formed of a number of plies of fibers, each ply including fibers. In one embodiment, the reinforcing layer(s) can include two plies, which can optionally be counterwound unidirectional plies. The reinforcing layer(s) can include two plies, which can optionally be wound in about equal but opposite helical directions. The reinforcing layer(s) can include three, four, five, six, seven, eight, or more plies of fibers, each ply independently wound in a helical orientation relative to the longitudinal axis. Plies may have a different helical orientation with respect to another ply, or may have the same helical orientation. The reinforcing layer(s) may include plies and/or fibers that have a partially and/or a substantially axial orientation. The reinforcing layer may include plies of fibers with a tape or coating, such as a tape or coating that includes abrasion resistant material or polymer, disposed between each ply, underneath the plies, on the outside of the plies, or optionally disposed between only certain plies. In some embodiments, an abrasion resistant layer is disposed between plies that have a different helical orientation.

Fibers in the reinforcing layer can include structural fibers and/or flexible yarn components. The structural fibers can be formed of graphite, glass, carbon, KEVLAR, aramid, fiberglass, boron, polyester fibers, polyamide, ceramic, inorganic or organic polymer fibers, mineral based fibers such as basalt fibers, metal fibers, and wire. The flexible yarn components, or braiding fibers, graphite, glass, carbon, KEVLAR, aramid, fiberglass, boron, polyester fibers, polyamide, ceramic, inorganic or organic polymer fibers, mineral based fibers such as basalt fibers, metal fibers, and wire. For example, structural and/or flexible fibers can include glass fibers that comprise e-glass, e-cr glass, Advantex®, s-glass, d-glass, borosilicate glass, soda-lime glass or a corrosion resistant glass. The fibers included in the reinforcing layer(s) can be woven, braided, knitted, stitched, circumferentially wound, helically wound, axially oriented, and/or other textile form to provide an orientation as provided herein (e.g., in the exemplary embodiment, with an orientation between substantially about thirty degrees and substantially about seventy degrees relative to the longitudinal axis). The fibers can be biaxially or triaxially braided.

Reinforcing layers contemplated herein may include fibers that are at least partially coated by a matrix, or may include fibers that are embedded within a matrix, or may include a combination. A reinforcing layer may comprise up to about 30% of matrix by volume, up to about 50% of matrix by volume, up to about 70% of matrix by volume, or even up to about 80% or higher by volume.

The matrix material may be a high elongation, high strength, impact resistant polymeric material such as epoxy. Other alternative matrixes include nylon-6, vinyl ester, polyester, polyetherketone, polyphenylene sulfide, polyethylene, polypropylene, thermoplastic urethanes, and hydrocarbons such as waxes or oils. For example, a reinforcing layer may also include a matrix material such as polyethylene, e.g. low density polyethylene, medium density polyethylene, linear low density polyethylene, high density polyethylene, polypropylene, cross-linked polyethylene, polybutylene, polybutadiene, or polyvinylchloride.

A reinforcing layer may further include pigments, plasticizers, flame retardants, water resistant materials, water absorbing materials, hydrocarbon resistant materials, hydrocarbon absorbent materials, permeation resistant materials, permeation facilitating materials, lubricants, fillers, compatibilizing agents, coupling agents such as silane coupling agents, surface modifiers, conductive materials, thermal insulators or other additives, or a combination of these.

In one embodiment, the reinforcing layer(s) includes fibers having a modulus of elasticity of greater than about 5,000,000 psi, and/or a strength greater than about 100,000 psi. In some embodiments, an adhesive can be used to bond the reinforcing layer(s) to the liner. In other embodiments, one or more reinforcing layers are substantially not bonded to one or more of other layers, such as the inner liner, internal pressure barriers, or external layer(s).

The disclosed spoolable tube may include reinforcing and other layers, and other embodiments as disclosed in U.S. Pat. Nos. 5,097,870, 5,921,285; 6,016,845; 6,148,866; 6,286,558; 6,357,485; and 6,604,550, hereby incorporated by reference in their entireties. For example the disclosed tubes may also comprise an external layer(s) that can provide wear resistance, UV, and impact resistance or thermal insulation, or selectively increase or decrease the permeability.

The disclosed spoolable tubes can also include one or more couplings or fittings. For example, such couplings may engage with, be attached to, or in contact with one or more of the internal and external layers of a tube, and may act as a mechanical load transfer device. Couplings may engage one or both of the inner liner or the reinforcing layer. Couplings or fittings may be comprised, for example, of metal or a polymer, or both with or without elastomeric seals such as O-rings. In some embodiments, such couplings may allow tubes to be coupled with other metal components. In addition, or alternatively, such couplings or fittings may provide a pressure seal or venting mechanism within or external to the tube. One or more couplings may each independently be in fluid communication with the inner layer and/or in fluid communication with one or more reinforcing layers and/or plies of fibers, or be in fluid communication with one or more of the plurality of channels. In an embodiment, a coupling or fitting includes multi cells or multi fitting so as to match the plurality of channels in a tube.

Such couplings may provide venting, to the atmosphere, of any gasses or fluids that may be present in any of the layers between the external layer and the inner layer, inclusive.

Again with reference to FIG. 1, the disclosed spoolable tubes can also include one or more energy or data conductors that can, for example, be integral with a wall of the spoolable pipe. Accordingly, the conductors can be integral with the inner layer, and reinforcing layer(s), and/or exist between such inner layer and reinforcing layer and/or exist between the reinforcing layer and an optional external layer. In some embodiments, the conductor can extend along the length of the spoolable tube. The conductors can include an electrical guiding medium (e.g., electrical wiring), an optical and/or light guiding medium (e.g., fiber optic cable), a hydraulic power medium (e.g., a high pressure tube or a hydraulic hose), a data conductor, and/or a pneumatic medium (e.g., high pressure tubing or hose).

The disclosed energy conductors can be oriented in at least a partially helical direction relative to a longitudinal axis of the spoolable tube, and/or in an axial direction relative to the longitudinal axis of the spoolable tube. A hydraulic control line embodiment of the conductor can be either formed of a metal, composite, and/or a polymeric material.

In one embodiment, several conductors can power a machine operably coupled to the coiled spoolable tube. For instance, a spoolable tube can include three electrical energy conductors that provide a primary line, a secondary line, and a tertiary line for electrically powering a machine using a three-phase power system.

Figure 2:
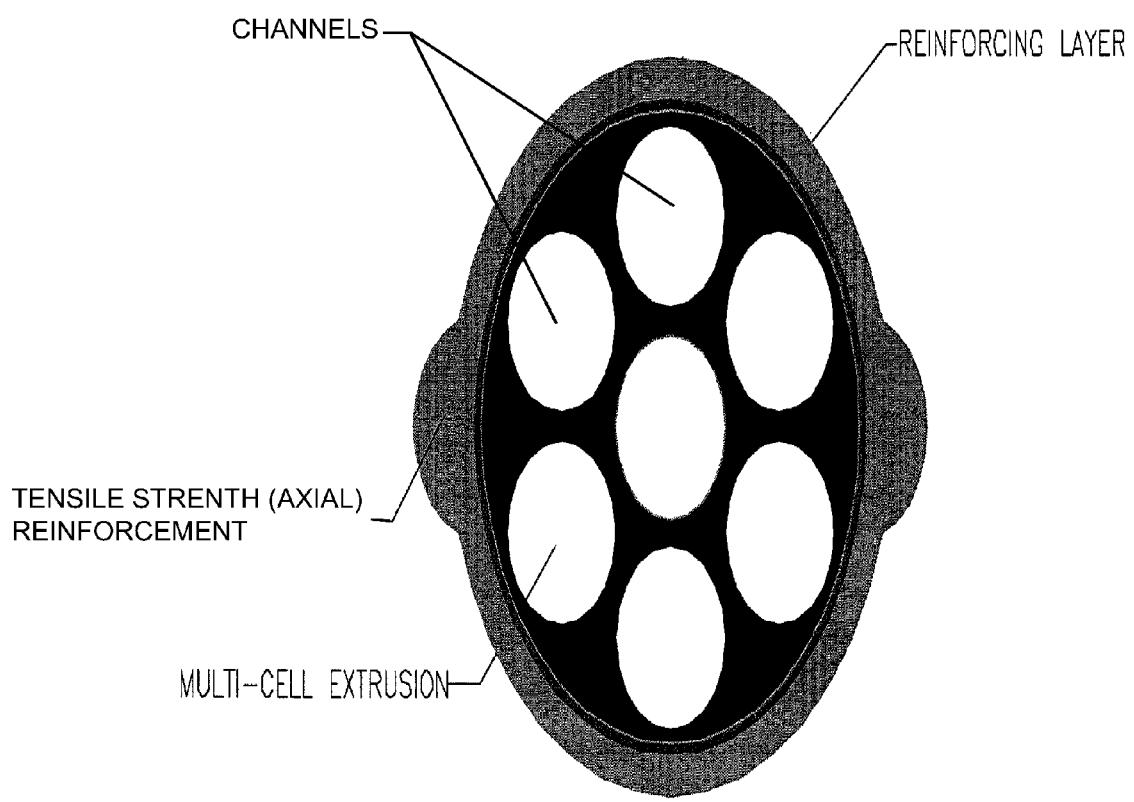
FIG. 2 depicts a disclosed pipe with a multi-channel inner liner, a reinforcing layer, and axial reinforcement exterior to the reinforcing layer.

FIG. 2 depicts a tube with a inner liner that includes a plurality of channels, a reinforcing layer, and an axial reinforcement. Such an axial reinforcement may be associated with the reinforcing layer, as depicted in FIG. 2. In some embodiments, the axial reinforcement may be placed in or close to the neutral bending axis of the tube to allow spooling and/or may increases the tensile strength of the assembly thereby allowing it to be used in greater vertical hanging lengths.

Such axial reinforcement may include for example reinforcement tape and/or fibers, e.g. glass, wound helically or axially around the pipe or reinforcing layer.

Also provided herein is a method of transporting a multi-phase fluid comprising providing a spoolable pipe disclosed herein, introducing a multi-phase fluid into an inlet of the pipe such that the multiphase fluid can travel along the plurality of channels, and recombining the fluid at an outlet of the pipe. Such methods may provide for substantially continuous constant flow of all phases of the multi-phase fluid.

In an embodiment, a method is provided for forming, manufacturing, or making a spoolable pipe capable of transporting multi-phase fluid, wherein the method includes extruding a thermoplastic polymer to form an inner layer that includes a plurality of channels, and forming a reinforcing layer over, e.g., adjacent to, the extruded inner layer to form a spoolable pipe.

Although the methods, systems and tubes have been described relative to a specific embodiment(s) thereof, they are not so limited. Many modifications and variations may become apparent in light of the above teachings. Many additional changes in the details, materials, and arrangement of parts, herein described and illustrated, can be made by those skilled in the art. Accordingly, it will be understood that the following claims are not to be limited to the embodiments disclosed herein, can include practices otherwise than specifically described, and are to be interpreted as broadly as allowed under the law.

All publications and patents mentioned herein, including those items listed below, are hereby incorporated by reference in their entirety as if each individual publication or patent was specifically and individually indicated to be incorporated by reference. In case of conflict, the present application, including any definitions herein, will control.

The invention claimed is:

1. A spoolable tube for enhanced internal fluid flow, comprising:
   a substantially low axial strength inner layer of unitary construction comprising a plurality of channels for transporting fluid and resisting leakage of internal fluids, wherein the plurality of channels are formed by multi-cell extrusion, and wherein said low axial strength inner layer comprises a polymer selected from at least one of a thermoplastic polymer, a thermoset polymer and an elastomer; and
   an outer reinforcing layer substantially surrounding the inner layer comprising fibers and a matrix, wherein the fibers comprise at least one of a glass, an aramid, a carbon, a metal, and a polymer.

2. The spoolable tube of claim 1, wherein a pressure within the tube is substantially maintained by the outer reinforcing layer.

3. The spoolable tube of claim 2, wherein a pressure differential between said channels is not greater than about 100 psi.

4. The spoolable tube of claim 1, wherein said polymer comprises at least one of: polyethylene, polyamide and polypropylene.

5. The spoolable tube of claim 1, wherein said channels have circular, oval, rectangular, square, or polygonal cross-sectional shape.

6. The spoolable tube of claim 1, wherein said fibers are helically wound about the axis of said tube.

7. The spoolable tube of claim 1, wherein the fibers are cross-plied with an orientation of about ±40° to about ±70° about the axis of said tube.

8. The tube of claim 1, further comprising a sensor.

9. The tube of claim 1, further comprising an energy conductor or a data conductor that extends along the length of the tube.

10. The tube of claim 1, further comprising electrical power conductors.

11. The tube of claim 1, further comprising axial reinforcement external to said inner layer.

12. A method of transporting a multi-phase fluid comprising:
   providing a spoolable pipe of claim 1;
   introducing a multi-phase fluid into an inlet of the spoolable pipe such that the multiphase fluid can travel along the plurality of the channels; and
   recombining the fluid at an outlet of the spoolable pipe, and therefore providing substantially continuous constant flow of all phases of the multi-phase fluid.

13. The tube of claim 1, wherein the channels provide the only paths for fluid transport within the tube.

14. A method for forming a spoolable pipe capable of transporting multi-phase fluid comprising:
   extruding a thermoplastic polymer to form a unitary inner layer comprising a plurality of channels for transporting fluid and resisting leakage of internal fluids, wherein the plurality of channels are formed by multi-cell extrusion, and wherein said low axial strength inner layer comprises a polymer selected from at least one of a thermoplastic polymer, a thermoset polymer and an elastomer; and forming a reinforcing layer comprising fibers and a matrix over the inner layer to form a spoolable pipe, wherein the fibers comprise at least one of a glass, an aramid, a carbon, a metal, and a polymer.

15. The method of claim 14, wherein the forming a reinforcing layer comprises helically winding fibers around the inner layer.

16. The method of claim 15, wherein the forming a reinforcing layer further comprises applying a matrix.

\* \* \* \* \*